(12) United States Patent
Zappaterra et al.

(10) Patent No.: US 10,397,950 B1
(45) Date of Patent: Aug. 27, 2019

(54) METHOD AND APPARATUS FOR MANAGING SEQUENTIAL COMMUNICATION ON A WIRELESS CHANNEL

(71) Applicant: Sprint Spectrum L.P., Overland Park, KS (US)

(72) Inventors: Luca Zappaterra, Arlington, VA (US); Yu Zhou, Herndon, VA (US); Muhammad A. Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 559 days.

(21) Appl. No.: 14/799,852

(22) Filed: Jul. 15, 2015

(51) Int. Cl.
  *H04L 1/18* (2006.01)
  *H04W 28/02* (2009.01)
  *H04W 74/00* (2009.01)
  *H04W 74/08* (2009.01)

(52) U.S. Cl.
  CPC ......... *H04W 74/002* (2013.01); *H04L 1/1829* (2013.01); *H04W 28/0268* (2013.01); *H04W 74/0816* (2013.01)

(58) Field of Classification Search
  CPC ........... H04W 74/002; H04W 28/0268; H04W 74/0816; H04L 1/1829
  See application file for complete search history.

(56) References Cited

U.S. PATENT DOCUMENTS

| 8,824,495 | B2 | 9/2014 | Qin et al. | |
|---|---|---|---|---|
| 2002/0163933 | A1* | 11/2002 | Benveniste | H04L 47/10 370/465 |
| 2004/0258040 | A1* | 12/2004 | Joshi | H04W 4/14 370/349 |
| 2005/0111410 | A1 | 5/2005 | Bazar | |
| 2005/0243782 | A1* | 11/2005 | Sakoda | H04L 47/10 370/338 |
| 2006/0120339 | A1* | 6/2006 | Akiyama | H04L 1/1678 370/338 |

(Continued)

OTHER PUBLICATIONS

Bharghava et al. MACAW: A Media Access Protocol for Wireless LAN's Proc SigComm 1994 Conf on Communication Architectures Protocol and Applications Aug. 1994 p. 212-225.*

(Continued)

*Primary Examiner* — Jeffrey M Rutkowski
*Assistant Examiner* — Basil Ma

(57) ABSTRACT

Disclosed is a method and apparatus to help manage communication on a wireless channel when transmitting and receiving nodes will engage in a sequence of data-ACK exchanges with each other on the channel. As disclosed, the transmitting node and/or receiving node may include in at least one of the data-ACK exchanges an indication of how many data-ACK exchanges remain in the sequence and may further include indicia of how often each data-ACK exchange will occur and how long each data-ACK exchange will last. A neighboring node that is observing the channel to determine whether the channel is available may thus determine, based at least in part on the indication in the data-ACK exchange how many times to refrain from transmitting on the channel, how often to so refrain, and how long to refrain in each instance.

20 Claims, 7 Drawing Sheets

(56) References Cited

U.S. PATENT DOCUMENTS

2011/0176420 A1* 7/2011 Shiotsuki ............... H01Q 19/32
                                                             370/235
2012/0320856 A1* 12/2012 Kim ..................... H04W 28/26
                                                             370/329
2016/0119455 A1* 4/2016 Stacey ................... H04L 69/324
                                                             370/336

OTHER PUBLICATIONS

Cast, Mathew Apr. 2005 802.11 Wireless Networks: The Definitive Guid 2005. Section on Frame Format.*
IEEE Std 802.11-2012 Part 11 Wireless LAN Medium Access Control and Physical Layer Specification. Section 8.2.5 (Year: 2012).*

* cited by examiner

FIRST WCD AND SECOND WCD ENGAGE IN A SEQUENCE OF N DATA-ACK EXCHANGES WITH EACH OTHER, WHERE N > 1, AND WHERE EACH DATA-ACK EXCHANGE CONSISTS OF THE FIRST WCD TRANSMITTING APPLICATION DATA TO THE SECOND WCD AND THE SECOND WCD TRANSMITTING A CORRESPONDING ACK MESSAGE TO THE FIRST WCD — 40

TRANSMIT WITHIN AT LEAST ONE OF THE DATA-ACK EXCHANGES AN INDICATION OF HOW MANY DATA-ACK EXCHANGES REMAIN IN THE SEQUENCE — 42

Fig. 4

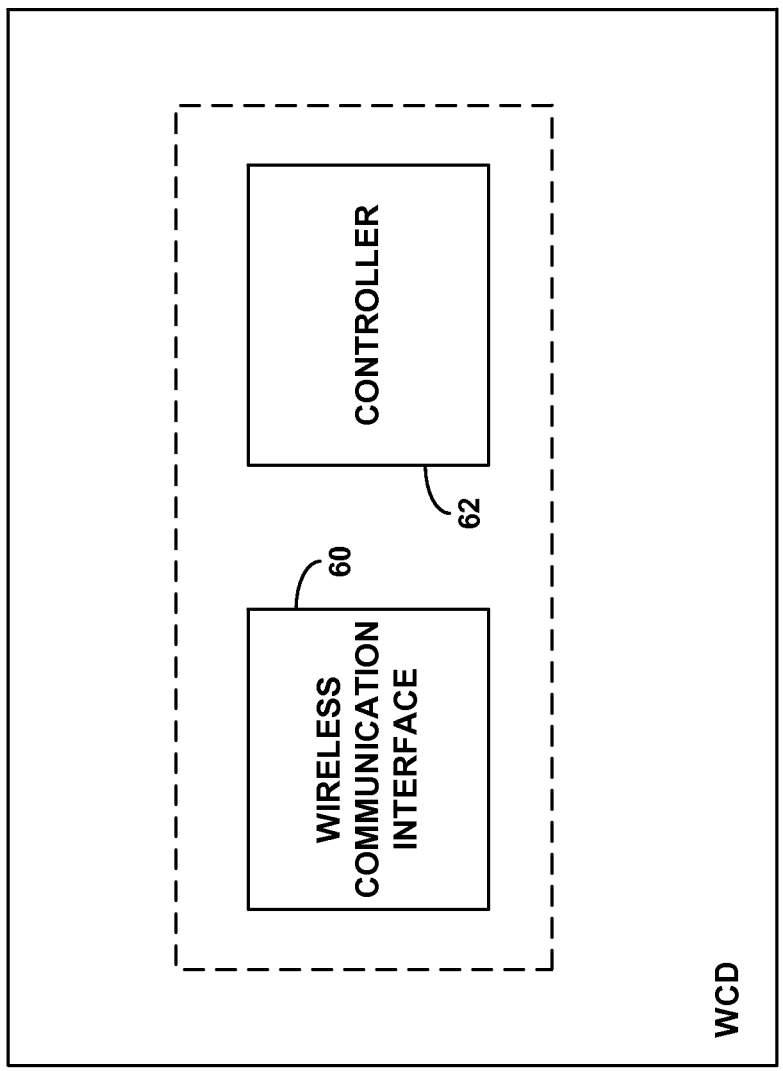

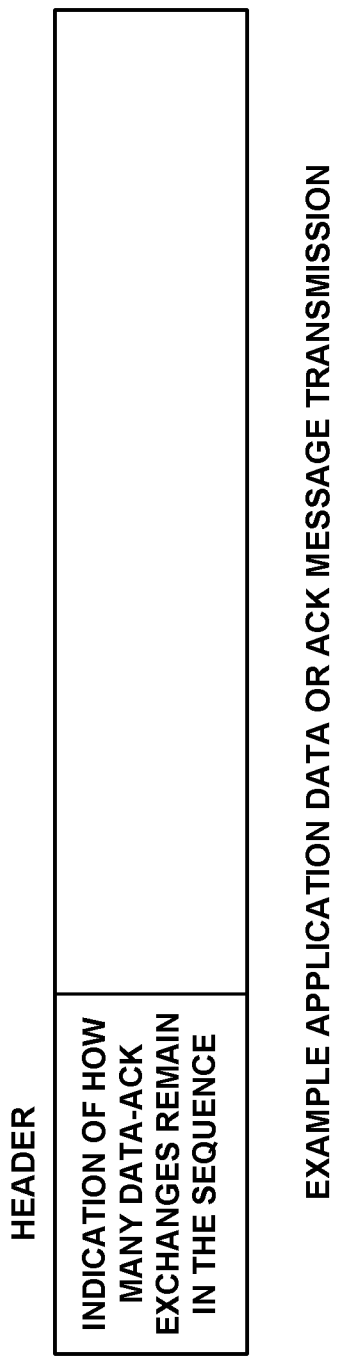

METHOD AND APPARATUS FOR MANAGING SEQUENTIAL COMMUNICATION ON A WIRELESS CHANNEL

BACKGROUND

Unless otherwise indicated herein, the description provided in this section is not itself prior art to the claims and is not admitted to be prior art by inclusion in this section.

In a wireless communication system that implements carrier sense multiple access with collision avoidance (CSMA/CA), when a transmitting node has data to send to a receiving node on a shared wireless channel, the transmitting node will first listen to the channel for a certain interval to determine whether another node is transmitting on the channel, and the transmitting node will then transmit only if it thereby determines that the channel is idle. Once the transmitting node then transmits its data to the receiving node, the receiving node will then send an acknowledgement (ACK) message on the channel to the transmitting node.

While such a system may work well in some situations, the system can also suffer from a problem known as the "hidden node" problem. The hidden node problem arises when a neighboring node is within range of the receiving node but is not within range of the transmitting node and where the neighboring node transmits on the channel. In such a scenario, transmitting node would be unable to hear transmission from the neighboring node on the channel and may therefore conclude that the channel is idle, but the neighboring node's transmission on the channel may make it impossible for the receiving node to receive transmission from the transmitting node on the channel.

To help overcome the hidden node problem, the transmitting and receiving nodes can engage in a handshake process on the channel before the transmitting node transmits the data to the receiving node, to ensure that transmitting and receiving nodes are able to communicate with each other on the channel. In accordance with the handshake process, once the transmitting node determines that the channel is idle, the transmitting node would transmit a "ready-to-send" (RTS) message on the channel to the receiving node, to indicate that the transmitting node is ready to send data to the receiving node. If the receiving node successfully receives that RTS message from the transmitting node, the receiving node would then respond by transmitting a "clear-to-send" (CTS) message on the channel, which would indicate to the transmitting node that the transmitting node may proceed with the data transmission. In turn, if the transmitting node successfully receives the CTS message from the receiving node, the transmitting node would then proceed to transmit the data on the channel to the receiving node. And upon receipt of the data, the receiving node would then respond by transmitting an acknowledgement (ACK) message on the channel to the transmitting node.

In a system implementing such a handshake process, nodes may also be arranged to detect RTS and CTS messages on the channel and to avoid transmission on the channel for a period of time sufficient to allow the communication between transmitting and receiving nodes to complete (e.g., through ACK transmission). In practice, the avoidance time period may be referred to as a "network allocation vector" (NAV) period, and nodes may set their NAV period based on an expected duration of communication between the transmitting and receiving nodes. In particular, if a node detects an RTS message on the channel, then the node may set itself to avoid transmission on the channel for an RTS NAV that sufficient to allow for transmission of the corresponding expected CTS message, data, and ACK message. Likewise, if a node detects a CTS message on the channel, then the node may set itself to avoid transmission on the channel for a CTS NAV that is sufficient to allow for transmission of the corresponding expected data and ACK message.

OVERVIEW

Certain types of data communications between nodes may involve periodic or other forms of sequential transmission of small amounts of data. By way of example, this occurs with digitized voice communication, such as voice over Internet Protocol (VoIP) communication, where digitized voice is encoded at rate of a certain number of bytes per periodic interval, such as every 20 milliseconds, with the number of bytes per period depending on the codec. Given such coding, as a user speaks into a transmitting node, the node may periodically transmit to a receiving node a quantity of data representing the user's voice, and the receiving node may thus receive, decode, and play out the voice to another user. Other examples of periodic data communications are possible as well.

Applying the RTS/CTS/data/ACK process to periodic data communications may involve applying the process respectively for each instance of data communication. Thus, in an example VoIP scenario, for each transmission that occurs every 20 milliseconds, the transmitting node may verify that the channel is idle and then transmit an RTS message to the receiving node, the receiving node may then respond by transmitting a CTS message to the transmitting node, the transmitting node may then transmit the instance of voice data to the receiving node, and the receiving node may then transmit an ACK message to the transmitting node. With this process, the transmitting and receiving nodes can help to ensure that they are prepared for each instance of the data communication. Further, a neighboring node that may be checking to see if the channel is idle can detect the RTS and/or CTS and responsively set a NAV so as to avoid using the channel for an appropriate duration.

Unfortunately, however, engaging in the RTS/CTS handshake respectively for each instance of periodic data communication additionally burdens the channel and the processing power of both the transmitting and receiving nodes. Therefore, an improvement is desired.

Disclosed herein is a method and apparatus for improved management of communication on a wireless channel in a situation where a transmitting node and receiving node will be engaging in a sequence of data-ACK exchanges each involving the transmitting node transmitting an instance of data to the receiving node and the receiving node responding with transmission of an ACK message to the transmitting node (assuming successful receipt of the data). In particular, the disclosure may apply in a situation where a transmitting node and receiving node are going to engage in a sequence of N such data-ACK exchanges, where N is greater than 1. By way of example, this could occur in VoIP call with ongoing voice communication, with the value of N being set to cover an upcoming possible duration of speech, where each instance of data communication is a predefined duration, timing between each instance of data communication is a predefined duration, and each ACK is a predefined duration.

In accordance with the disclosure, the transmitting node and/or receiving node may include in at least one of the data-ACK exchanges of the sequence an indication of how many more data-ACK exchanges remain in the sequence. For instance, the transmitting node may include such an indication in the header of an instance of its data transmission to the receiving node, and/or the receiving node may include such an indication in the header of an instance of its ACK message transmission to the transmitting node. Advantageously, a neighboring node that is observing the channel to determine whether it is available may thus determine, based at least in part on the indication, how many data-ACK exchanges remain in the sequence, and the neighboring node may then responsively refrain from transmitting on the channel a number of times corresponding with the number of remaining data-ACK exchanges.

Further, the data-ACK exchanges of the sequence may occur periodically with a period T and may each span a duration $\Delta$, and the transmitting node and/or receiving node may also include in the data-ACK exchange one or more indicia of the values T and $\Delta$, so that the neighboring node can additionally determine how often each of the remaining data-ACK exchanges will occur and how long each data-ACK exchange will last. That way, the neighboring node can thus refrain from transmitting on the channel every period T for a duration of $\Delta$, for a total of the indicated number of remaining periods (i.e., the indicated number of remaining data-ACK exchanges of the sequence).

This process may advantageously avoid the need for the transmitting and receiving nodes to engage in an RTS/CTS handshake individually for each data-ACK exchange of the sequence. Rather, in practice, the transmitting and receiving nodes could engage in one RTS/CTS handshake for the sequence as a whole and could include in the RTS and/or CTS an indication of how many data-ACK exchanges will be in the sequence (and further the period T and duration $\Delta$) and after engaging in the RTS/CTS handshake may then engage in the sequence of data-ACK exchanges each (perhaps all but the last) including the indication of how many data-ACK exchanges remain in the sequence and perhaps the period T and duration $\Delta$. Thus, a neighboring node observing the channel at the time of the RTS/CTS handshake may set itself to apply a periodic NAV of the data-ACK duration $\Delta$, with the period T, and for the indicated number of times N. And a neighboring node that begins observing the channel after the RTS/CTS handshake but during the sequence of data-ACK exchanges may advantageously determine how many data-ACK exchanges remain and perhaps how often and how long each data-ACK exchange will occur and may set itself to apply a periodic NAV of the data-ACK duration $\Delta$, with the period T, and for the indicated remaining number of times. Thus, the neighboring node may refrain from using the channel for the appropriate number of remaining times, with a period T and duration $\Delta$.

In an example implementation of this process, the type of data communication at issue may have a quality of service (QoS) class, and the transmitting node and/or receiving node may indicate the QoS class of the communication during the RTS/CTS handshake and/or during the data-ACK exchange. Such an indication could serve various purposes.

By way of example, the QoS class indication could itself correspond with a particular value of N (a quantity of data-ACK exchanges per sequence), with a particular period T of the data-ACK exchanges, and/or with a particular duration $\Delta$ of each data-ACK exchange, and nodes implementing this process may be provisioned with data or program logic that specifies that correlation.

Thus, the transmitting node could perhaps simply indicate the QoS class of the communication in its RTS message to the receiving node as a way to let the receiving node know the value N, so that the receiving node can then keep track of how many data-ACK exchanges remain in the sequence and thereby be able to indicate the remaining number of instances in its CTS message to the transmitting node and in at least one of the data-ACK exchanges. Further, the transmitting node inclusion of the QoS class in its RTS message could also function to notify a neighboring node of the value of N and perhaps the values of T and $\Delta$ for the sequence of data-ACK exchanges, so that the neighboring node can set an appropriate NAV for refraining from transmission on the channel. In addition, the transmitting node could likewise indicate the QoS class in at least one of the data-ACK exchanges of the sequence, which may also function to notify a neighboring node of the values of T and $\Delta$ for the sequence of data-ACK exchanges, to help the neighboring node set itself to apply an appropriate NAV at an appropriate repetition period for refraining from transmission on the channel each of the indicated number of remaining data-ACK exchanges of the sequence.

Similarly, the receiving node could indicate the QoS class in its CTS message to the transmitting node, which could function to notify a neighboring node of the value of N and perhaps the values of T and $\Delta$ for the sequence of data-ACK exchanges, so that the neighboring node can set itself to apply an appropriate NAV at an appropriate repetition period for refraining from transmission on the channel the indicated number N of times. And the receiving node can likewise indicate the QoS class in at least one of the data-ACK exchanges of the sequence, which may also function to notify a neighboring node of the values of T and $\Delta$ for the sequence of data-ACK exchanges, to similarly help the neighboring node set itself to apply an appropriate NAV at an appropriate repetition period for refraining from transmission on the channel the indicated number of remaining data-ACK exchanges of the sequence.

As another example, the indication of QoS class of the communication in an RTS message, in a CTS message, or in a data-ACK exchange of the sequence can also enable a neighboring node to determine whether or not to transmit on the channel, considering a QoS class of a communication planned by the neighboring node. In particular, a neighboring node may read the RTS message transmission, CTS message transmission, data transmission, or ACK message transmission to determine the QoS class of the communication and (i) if the neighboring node seeks to communicate data at the same or lower QoS class, can refrain from using the channel for the appropriate NAV period, but (ii) if the neighboring node seeks to communicate data at a higher QoS class, can then usurp use of the channel by proceeding with the data communication.

Accordingly, in one respect, disclosed herein is a method of managing communication on a wireless channel on which a first wireless communication device (WCD) and second WCD engage in a sequence of N data-ACK exchanges with each other, where N>1, and where each data-ACK exchange consists of the first WCD transmitting application data to the second WCD and the second WCD transmitting a corresponding ACK message to the first WCD. In that scenario, the method involves transmitting within at least one of the data-ACK exchanges an indication of how many data-ACK exchanges remain in the sequence. For instance, the first WCD may transmit the indication in a header of the application data of the data-ACK exchange and/or the second WCD may transmit the indication in a header of the ACK message of the data-ACK exchange. In either case, the indication of how many data-ACK exchanges remain in the sequence may thus help a third WCD manage how many times to refrain from transmission on the channel.

In another respect, disclosed is a WCD that is arranged to help manage communication on a wireless channel. Such a WCD may include a wireless communication interface (e.g., cellular or local area network radio and associated components) and a processing unit programmed with instructions that are executable by the processing unit to cause the WCD to carry out various operations to function in line with the discussion above as a transmitting node, a receiving node, and/or a neighboring node (depending on the circumstance).

In practice, for instance, the operations may include engaging in a sequence of N data-ACK exchanges on the channel with a peer WCD, where N>1, and where each data-ACK exchange consists of transmission of application data between the WCDs followed by reply transmission of a corresponding acknowledgement (ACK) between the WCDs. Further, the operations may include transmitting in at least one of the data-ACK exchanges an indication of how many data-ACK exchanges remain in the sequence. For instance, when operating as a transmitting node, the WCD may transmit the indication in a header of the application data of the data-ACK exchange. Or when operating as a receiving node, the WCD may transmit the indication in a header of the ACK message of the data-ACK exchange.

Further, when operating as a neighboring node, the operations may include detecting on the channel one or more indicia of how many data-ACK exchanges remaining in a sequence of data-ACK exchanges between two communicating devices, how often each data-ACK exchange occurs, and how long each data-ACK exchange is, making a determination based on the detected one or more indicia a duration of how often to engage in an instance of refraining from transmitting on the channel and how long to refrain from transmitting on the channel in each instance, and refraining from transmitting on the channel in accordance with the determination. And also when operating as a neighboring node, the operations may include detecting on the channel an indication of QoS class of a sequence of data-ACK exchange between two communicating devices, making a determination that the WCD seeks to communicate on the channel at a QoS level higher than the indicated QoS level, and, responsive to the determination, usurping use of the channel to engage in the communication at the higher QoS level.

Still further, in another respect, disclosed is a method for a neighboring node to manage communication on a wireless channel, in a situation where a first WCD and second WCD engage in sequence of N data-ACK exchanges on the channel, where N>1, and where each data-ACK exchange consists of the first WCD transmitting application data to the second WCD and the second WCD transmitting a corresponding ACK message to the first WCD. In that scenario, the method may involve a third (neighbor) WCD detecting in at least one of the data-ACK exchanges an indication of how many data-ACK exchanges remain in the sequence, the third WCD using the detected indication a basis to determine how many times to refrain from transmission on the channel, and the third WCD refraining from transmission on the channel for the determined number of times.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 4 is a depiction of operations in accordance with the disclosure.

FIG. 6 is a simplified block diagram of an example WCD operable in accordance with the disclosure.

FIG. 7 depicts an example application data or ACK message transmission including in a header an indication of how many data-ACK exchanges remain in the sequence.

DETAILED DESCRIPTION

The present method and system will be described by way of example in the context of IEEE 802.11 (WiFi) communications. However, it should be understood that the principles described could be applied as well in numerous other contexts, not limited to the specifics described.

The 802.11 standards provide for centralized and peer-to-peer communication between WCDs such as computers, cell phones, appliances, access points, small cells, and other wirelessly-equipped devices, over shared wireless channels. Each such WCD will have a MAC address that uniquely identifies the WCD as compared with other WCDs, and communications between WCDs may include headers that carry source and destination MAC addresses, with the source MAC address being the MAC address of the WCD from which the communication is being sent and the destination MAC address being the MAC address of the WCD to which the communication is being sent.

Historically, 802.11 has operated on discrete 20 MHz wide wireless channels, with communication between a pair of WCDs occurring on a single such channel. In basic practice, a transmitting WCD that seeks to transmit data to a receiving WCD would first listen to the channel for a defined time interval known as a DIFS (Distributed coordination function (DCF) interframe space) duration. If the transmitting WCD does not hear any transmissions on the channel for the DIFS duration, then the transmitting WCD would deem the channel to be idle and would responsively commence communication with the receiving WCD on the channel, possibly making use of the basic RTS/CTS/data/ACK process described above.

To provide increased data throughput, recent versions of 802.11 including 802.11n and 802.11ac now also allow a pair of WCDs to communicate with each other on an aggregate of multiple 20 MHz channels at once. With such an arrangement, a transmitting WCD may evaluate multiple such channels to determine if they are idle in the manner described above, and the transmitting WCD may be configured (i) to commence communication with the receiving WCD concurrently on all of those channels, only if the transmitting WCD deems all of the channels to be idle, or (ii) to commence communication with the receiving WCD concurrently on just the contiguous channels that the WCD deems to be idle. Further, under 802.11n/ac, the transmitting WCD and receiving WCD would also engage in the RTS/CTS/data/ACK process respectively on each channel that the transmitting WCD selects for use.

Each WCD engaged in 802.11 communication will have an effective range of transmission, defined by the WCD's antenna structure, transmission power, and frequency of operation (with lower frequencies typically having less propagation loss and thus wider range). The range of transmission of one WCD could thus be the same as or different than the range of transmission of another WCD.

Figure 1:
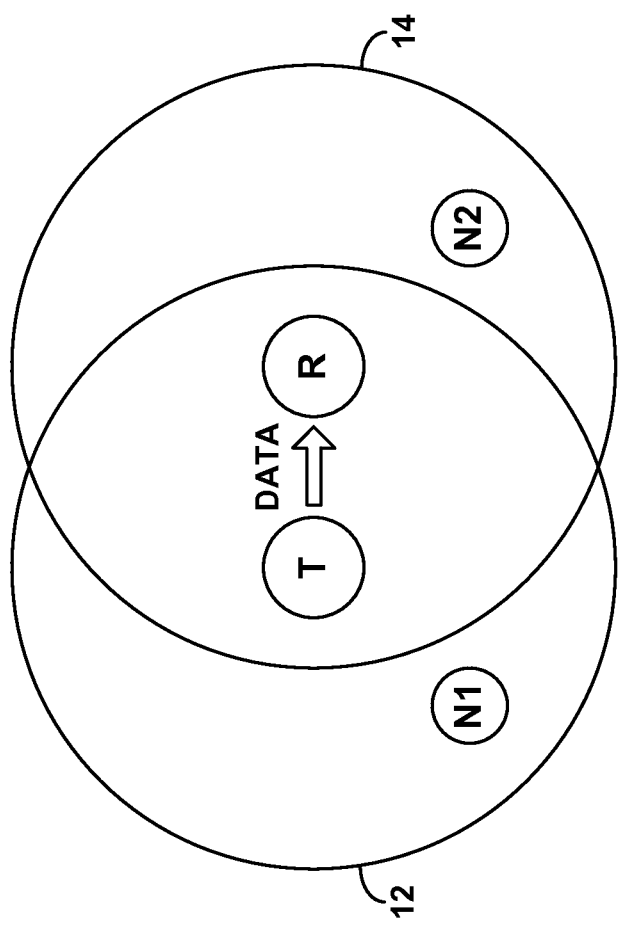
FIG. 1 is a depiction of a scenario in which a transmitting WCD seeks to transmit data to a receiving WCD.

FIG. 1 depicts an example arrangement in which a transmitting WCD, "T", seeks to transmit data (e.g., bearer data, initiated at an application layer or the like) to a receiving WCD, "R", on a representative 802.11 channel, and where neighboring WCDs, "N1" and "N2", are positioned in the vicinity. As shown in FIG. 1, the transmitting WCD has a respective range of transmission 12 and the receiving WCD has a respective range of transmission 14. The receiving WCD is shown within the transmitting WCD's range of transmission, so that the receiving WCD may receive transmissions from the transmitting WCD. Likewise, the transmitting WCD is shown within the receiving WCD's range of transmission, so that the transmitting WCD may receive transmissions from the receiving WCD. Further, the neighboring WCD N1 is shown within the transmitting WCD's range of transmission but outside the receiving WCD's range of transmission, so that the neighboring WCD N1 may receive transmissions from the transmitting WCD but may not receive transmissions from the receiving WCD. And the other neighboring WCD N2 is shown within the receiving WCD's range of transmission but outside the transmitting WCD's range of transmission, so that the neighboring WCD N2 may receive transmissions from the receiving WCD but may not receive transmissions from the transmitting WCD.

Figure 2:
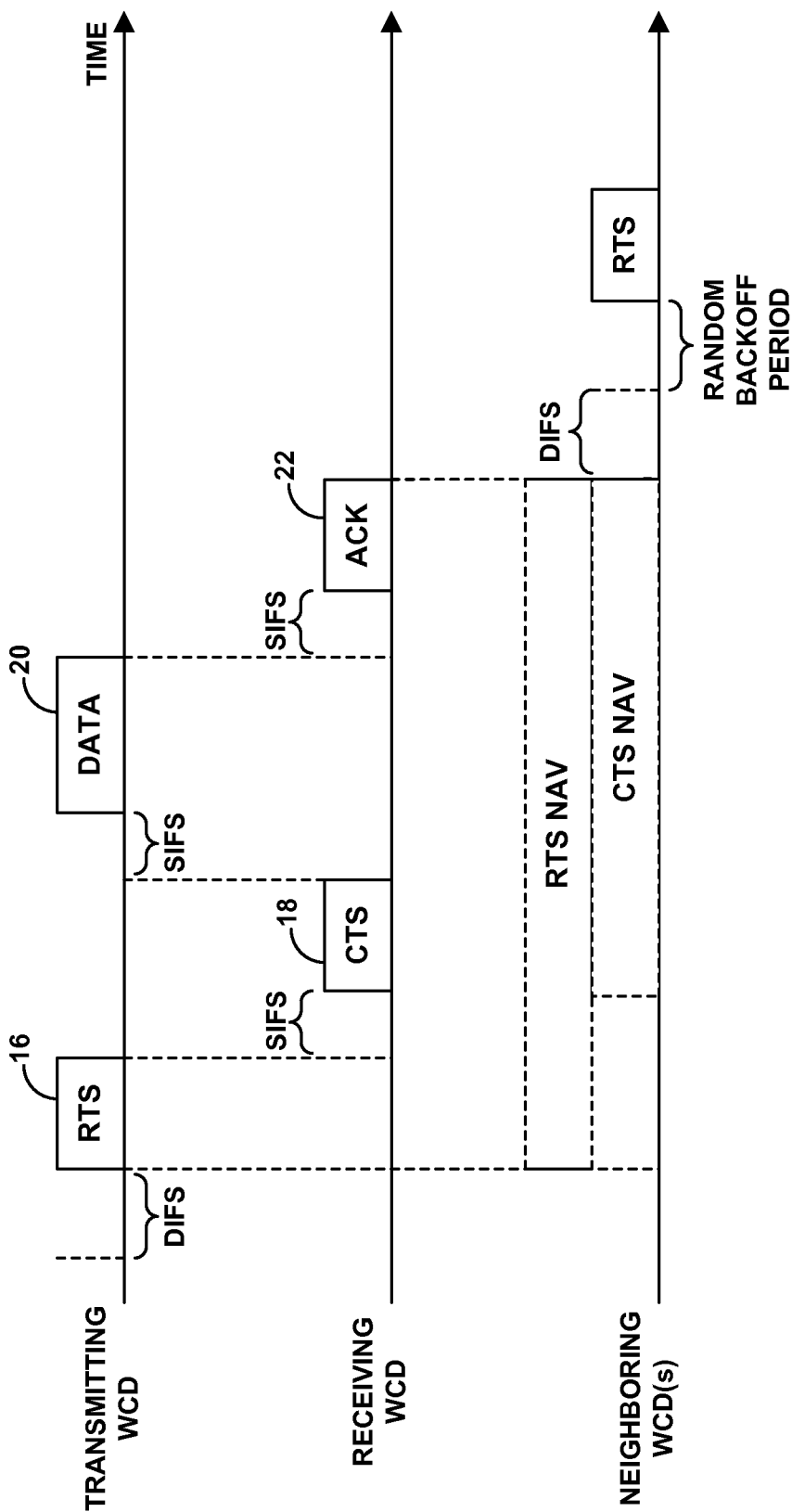
FIG. 2 is a depiction of an example RTS/CTS/data/ACK process.

FIG. 2 next depicts an example RTS/CTS/data/ACK process with this arrangement, on a representative 802.11 channel, although it should be understood that under 802.11n/ac or the like, the WCDs may engage in a similar process concurrently on multiple channels that the transmitting WCD deems to be idle.

As shown in FIG. 2, the transmitting WCD first monitors the channel for the DIFS duration to determine that the channel is idle. Upon thereby deeming the channel to be idle, the transmitting WCD then transmits to the receiving WCD an RTS message 16 as an indication that the transmitting WD has data to transmit to the receiving WCD. The RTS message may carry source and destination MAC addresses and a value (e.g., a control message sub-type value) indicating that the message is an RTS message, among possibly other information such as a transmission timestamp for instance. Further, a predefined segment of time may be provided for this RTS message transmission.

Assuming the receiving WCD successfully receives the RTS message from the transmitting WCD, the receiving WCD would thus become aware that the transmitting WCD has data to send to the receiving WCD. As further shown, the receiving WCD then responsively waits a predefined time interval known as an SIFS (short interframe space) duration, shorter than the DIFS duration, and then transmits on the channel a CTS message 18 as an indication of readiness to receive and thus that the transmitting WCD is clear to send. The CTS message may carry a destination MAC address (of the transmitting WCD) and a value (e.g., another control message sub-type value) indicating that the message is a CTS message, among possibly other information such as a transmission timestamp for instance. Further, a predefined segment of time may be provided for this CTS message transmission.

Assuming the transmitting WCD successfully receives the CTS message from the receiving WCD, the transmitting WCD would thus become aware that the transmitting WCD is clear to transmit to the receiving WCD. The transmitting WCD would then responsively wait another SIFS duration and would then transmit the data 20 to the receiving WCD. The data transmission may carry source and destination MAC addresses and a value indicating that the transmission is a data transmission and may then of course carry the data (e.g., bearer data), among possibly other information. A representative implementation assumes that the data transmission is of a predefined duration or extent, which may accommodate just a portion of data buffered by the transmitting WCD for transmission to the receiving WCD. Alternatively, implementations could provide for adaptive data transmission size, possibly having the RTS message specify the data duration and the CTS message confirm the data duration.

Assuming the receiving WCD successfully receives the data transmission from the transmitting WCD, the receiving WCD would then wait another SIFS duration and then respond to the successful receipt of the data transmission by transmitting to the transmitting WCD an ACK message 22 to acknowledge receipt of the data. Similar to the CTS transmission discussed above, the ACK message may carry a destination MAC addresses and a value (e.g., another control message sub-type value) indicating that the message is an ACK message, among possibly other information such as a transmission timestamp for instance. Further, a predefined segment of time may be provided for this ACK message transmission.

As noted above, a neighboring WCD may be arranged to detect transmissions on the channel and responsively forgo use of (transmission on) the channel for a NAV period sufficient to allow for completion of the associated communication. A neighboring WCD may do this when the neighboring WCD itself seeks to transmit data on the channel and thus monitors the channel for a DIFS duration as noted above. If the neighboring WCD thereby detects that the channel is not idle, then the neighboring WCD may set an appropriate NAV timer and then avoid use of the channel for the duration of that NAV timer. Upon expiration of the NAV timer, the neighboring WCD may then monitor the channel for a new DIFS duration, possibly plus a random backoff period, and if the channel is idle may then send its own RTS message.

By way of example, if neighboring WCD N1 detects the RTS message transmission from the transmitting WCD to the receiving WCD (noting from content of the transmission that the transmission is an RTS message transmission), then neighboring WCD N1 may responsively set and apply an RTS NAV timer for a duration spanning the RTS message, the first SIFS, the CTS message, the second SIFS, the data transmission, the third SIFS, and the ACK. Thus, neighboring WCD N1 would configure itself to forgo use of the channel for that full RTS NAV period, to allow the remainder of the communication exchange between the transmitting WCD and the receiving WCD to be fully carried out.

As another example, if neighboring WCD N2 detects the CTS message transmission from the receiving WCD (noting from content of the transmission that the transmission is a CTS message transmission), then neighboring WCD N2 may responsively set and apply a CTS NAV timer for a duration spanning the CTS message, the second SIFS, the data transmission, the third SIFS, and the ACK. Thus, neighboring WCD N2 would configure itself to forgo use of the channel for that full CTS NAV period, to allow the remainder of the communication exchange between the transmitting WCD and the receiving WCD to be fully carried out.

As discussed above, the present disclosure provides a method and apparatus to help manage communication on a wireless channel where transmitting and receiving WCDs will be engaging in periodic data communication, such as VoIP communication for instance. In particular, the periodic data communication would involve the transmitting WCD periodically transmitting application data (e.g., voice data or other application-layer data) to the receiving WCD and the receiving WCD transmitting an ACK message to the transmitting WCD respectively after each such instance of data transmission. As noted above, this arrangement this involves periodic data-ACK exchanges between the WCDs.

In practice, the data-ACK exchanges of the sequence may occur periodically with a period T and may each span a duration $\Delta$ (from the start of the data transmission to the end of the ACK message transmission), with the period T and duration $\Delta$ perhaps being based on the codec used for the application data or on one or more other factors. For instance, if the data communication is VoIP communication using a codec that provides for transmission of a predefined quantity of voice data every 20 milliseconds, the duration T spanning each instance of data transmission and its corresponding ACK message would be 20 milliseconds, and the duration $\Delta$ of each data-ACK exchange may be based on how long each data transmission instance is, plus a SIFS, plus the ACK duration. Other types of periodic data communication may have other durations T and $\Delta$. Further, it may also be possible for the duration of data-ACK exchanges to vary over time if the duration of a data transmissions vary or for other reasons.

Per the disclosure, the WCDs may work to reserve the channel for a certain number, N, of such data-ACK exchanges. For instance, in a voice call, when the transmitting WCD begins receiving voice from its user for transmission to the receiving WCD, the WCDs may work to reserve the channel for N data-ACK exchanges, and as the transmitting WCD then continues to receive further voice from its user, the WCDs may repeat the process to reserve the channel for a next N data-ACK exchanges (or some other number of data-ACK exchanges). By way of example and without limitation, given data-ACK exchanges that occur every 20 milliseconds and that each last for 1 millisecond, the WCDs could arrange to reserve the channel over a 1 second duration by arranging to reserve the channel for N=50 data-ACK exchanges of 1 millisecond each that will occur every 20 milliseconds, or the WCDs could arrange to reserve the channel over a 5 second duration by reserving the channel for N=250 data-ACK exchanges of 1 millisecond each that will occur every 20 milliseconds. The number N of data-ACK exchanges between the WCDs would thus define a sequence of N data-ACK exchanges, where N>1.

To initially reserve the channel for the WCDs to engage in the sequence of N data-ACK exchanges, if the WCDs engage in an RTS/CTS handshake process, the devices may include in their RTS and CTS messaging one or more indicia of (i) the number N of data-ACK exchanges, (ii) the period T at which the data-ACK exchanges occur, and (iii) the duration $\Delta$ of each data-ACK exchange. By way of example, the transmitting WCD may include such indicia in its RTS message to the receiving WCD and/or the receiving WCD may include such indicia in its RTS message to the transmitting WCD. Advantageously, a neighboring WCD that is observing the channel to determine whether the channel is idle may thus be able to determine from the RTS message and/or CTS message how many data-ACK exchanges the sequence will include, how often the data-ACK exchanges will occur in the sequence, and how long each data-ACK exchange of the sequence will last. And the neighboring WCD may set itself to refrain from transmitting on the channel for an appropriate NAV period of duration $\Delta$ to occur every period T, for the number N of indicated times. (In practice, the neighboring node may set itself to refrain for a NAV through the first data-ACK transmission and then periodically for each additional data-ACK exchange.)

In practice, the indicia of values N, T, and $\Delta$ that the transmitting WCD and/or receiving WCD may include in the RTS/CTS messaging can take various forms. By way of example, it is possible that the type of application data being communicated may be deemed to have predefined values of N, T, and/or $\Delta$, and so the indicia could be a specification of the type of the application data, and WCDs could be provisioned with lookup tables and/or program logic to correlate application data types with values of N, T, and/or $\Delta$. In particular, the application data type could be defined as a quality of service (QoS) class value, and WCD lookup tables or logic could correlate QoS class values with values of N, T, and/or $\Delta$. For instance, VoIP (voice application data) could have a particular QoS class value that distinguishes it from other types of application data and that corresponds with particular predefined values of N, T, and $\Delta$ such as with N=50, T=20 milliseconds, and $\Delta$=1 millisecond. Alternatively or additionally, the indicia could include a more direct specification of N, T and/or $\Delta$.

The transmitting WCD may include the indicia in its RTS message to the receiving WCD by providing the indicia in one or more header fields of the RTS message, and WCDs may be configured read and interpret the indicia accordingly. For example, special sub-type field values could be defined to indicate that the message is an RTS message for a particular QoS class corresponding with particular predefined values of N, T, and/or $\Delta$, such as by using a 4-bit sub-class values in the range of 0000-0010 for any of three different such QoS classes. As another example, additional bits could be added to the RTS message as extension header fields or the like, to indicate QoS class or to more specifically indicate N, T, and/or $\Delta$. Thus, once the transmitting WCD determines that it is going to engage in a sequence of data-ACK exchanges with the receiving WCD, the transmitting WCD could provide such indicia in its RTS message to the receiving WCD.

Likewise, the receiving WCD may include the indicia in its CTS message to the receiving WCD by providing the indicia in one or more header fields of the CTS message, and WCDs may be configured to read and interpret the indicia accordingly. Here, special sub-type field values could be defined to indicate that the message is a CTS message for a particular QoS class corresponding with particular predefined values of N, T, and/or $\Delta$, such as by using a 4-bit sub-class value in the range of 0011-0110 for any of three different such QoS classes. And as another example, additional bits could be added to the CTS message as extension header fields or the like, to indicate QoS class or to more specifically indicate N, T, and/or $\Delta$. In practice, the receiving WCD's indicia would logically correspond with the indicia provided by the transmitting WCD, such as by being the same QoS class, the same N value, the same T value, and/or the same $\Delta$ value.

The process described so far can help to reserve the channel for the sequence of data-ACK exchanges between the transmitting and receiving WCDs, to the extent any neighboring WCD is checking the channel during the RTS/CTS messaging. But the process so far would not address the scenario where the transmitting and receiving WCDs are in the midst of the sequence of data-ACK exchanges and where a neighboring WCD only then begins to check the channel. If a neighboring WCD did not see the RTS or CTS messaging, the neighboring WCD may then see merely an instance of data transmission or ACK message transmission and (except for the final such data-ACK exchange of the sequence) may incorrectly conclude that the channel will be available after that particular data-ACK exchange.

To address this situation, or to address a situation where there is no RTS/CTS handshaking or no indication of N, T, and/or Δ in the RTS and CTS messaging, the present disclosure also provides for including in one or more of the data-ACK exchanges themselves one or more indicia of how many data-ACK exchanges remain in the sequence and perhaps what the period T and duration Δ of the data-ACK exchanges in the sequence are. (For instance, this could be done in each data-ACK exchange of the sequence, possibly except for the final data-ACK exchange. Further, the "remaining" data-ACK exchanges could include the one in which the indicia is provided or just the one or more data-ACK exchanges following that one in the sequence.) Thus, a neighboring WCD that is observing the channel to determine whether the channel is idle may be able to determine from the data-ACK exchange how many data-ACK exchanges remain, how often the data-ACK exchanges will occur, and how long each data-ACK exchange will be, and the neighboring WCD may set itself to refrain from transmitting on the channel for an appropriate NAV period to span each data-ACK exchange duration the indicated number of times at the indicated period.

In practice, the indicia of how many data-ACK exchanges remain in the sequence and what the period T and duration Δ of the data-ACK exchanges are can also take various forms, similar to the indicia discussed above. For example, the indicia of how many data-ACK exchanges remain in the sequence may be an integer value as a count of the number of data-ACK exchanges remaining, which the transmitting WCD and/or receiving WCD can track over the course of the sequence so as to be able to specify the correct remaining number. And the indicia of the period T and duration Δ of the data-ACK exchanges of the sequence could be a QoS class value or a more direct specification of the values T and Δ as discussed above.

The transmitting WCD may include such indicia in one or more headers of a data transmission in the sequence of data-ACK exchanges. Likewise, the receiving WCD may include such indicia in one or more headers of an ACK message transmission in the sequence of data-ACK exchanges. And a neighboring WCD newly observing the channel during the course of the sequence of data-ACK exchanges may then readily read the indicia included in such a data transmission or ACK message transmission so as to determine how many times to refrain from transmitting on the channel, how often to so refrain, and how long to refrain in each instance.

As a variation on the above process, it may also be feasible to not specify in the data-ACK exchange the value T and/or the value of Δ, but to instead have a neighboring WCD observe the channel to determine the period T and duration Δ based on how long each data-ACK exchange instance lasts and how much time passes between each such instance. Optimally, there could also be one or more indicia in each data-ACK exchange of the periodic nature of communication, to help trigger such an analysis by a neighboring WCD, and so the neighboring WCD may engage in such an analysis in response to detecting such indicia of the periodic nature of the communication.

Further, as another variation or supplement to the above process, the QoS class indication discussed above could also serve an additional purposes. Namely, the indication of QoS class by the transmitting WCD and/or receiving WCD could enable a neighboring WCD to determine whether to usurp the channel for a possibly higher level QoS class of communication. In particular, a neighboring WCD that seeks to transmit application data of a higher QoS class than the QoS class indicated in the data-ACK exchange may determine that its communication would be of a higher QoS class than that indicated and may responsively begin transmission on the channel, perhaps engaging in an RTS/CTS exchange with another WCD and so forth. (When the transmitting WCD and/or receiving WCD discussed above then observes the transmission on the channel by the neighboring WCD at the higher QoS level, the transmitting WCD and/or receiving WCD may responsively abort a remainder of the sequence of data-ACK exchanges so as to allow the higher QoS level communication to proceed.) Whereas, if the neighboring WCD determines that the QoS class of its planned communication is the same as or lower than that indicated, the neighboring WCD may refrain from transmission on the channel for an appropriate NAV as discussed above.

Still further, the disclosed process may apply as well in a scenario where there are no ACK messages but where a transmitting WCD will engage in a sequence of data transmissions to the receiving WCD. In that situation, the transmitting WCD may include in at least one of its data transmissions one or more indicia of how many more data transmissions remain in the sequence and how long each data transmission will be, using indicia such as described above for instance. And a neighboring WCD may then similarly determine from reading such a data transmission how many times the neighboring WCD should refrain from transmitting on the channel and how long to so refrain in each instance, and the neighboring WCD may operate accordingly.

Figure 3:
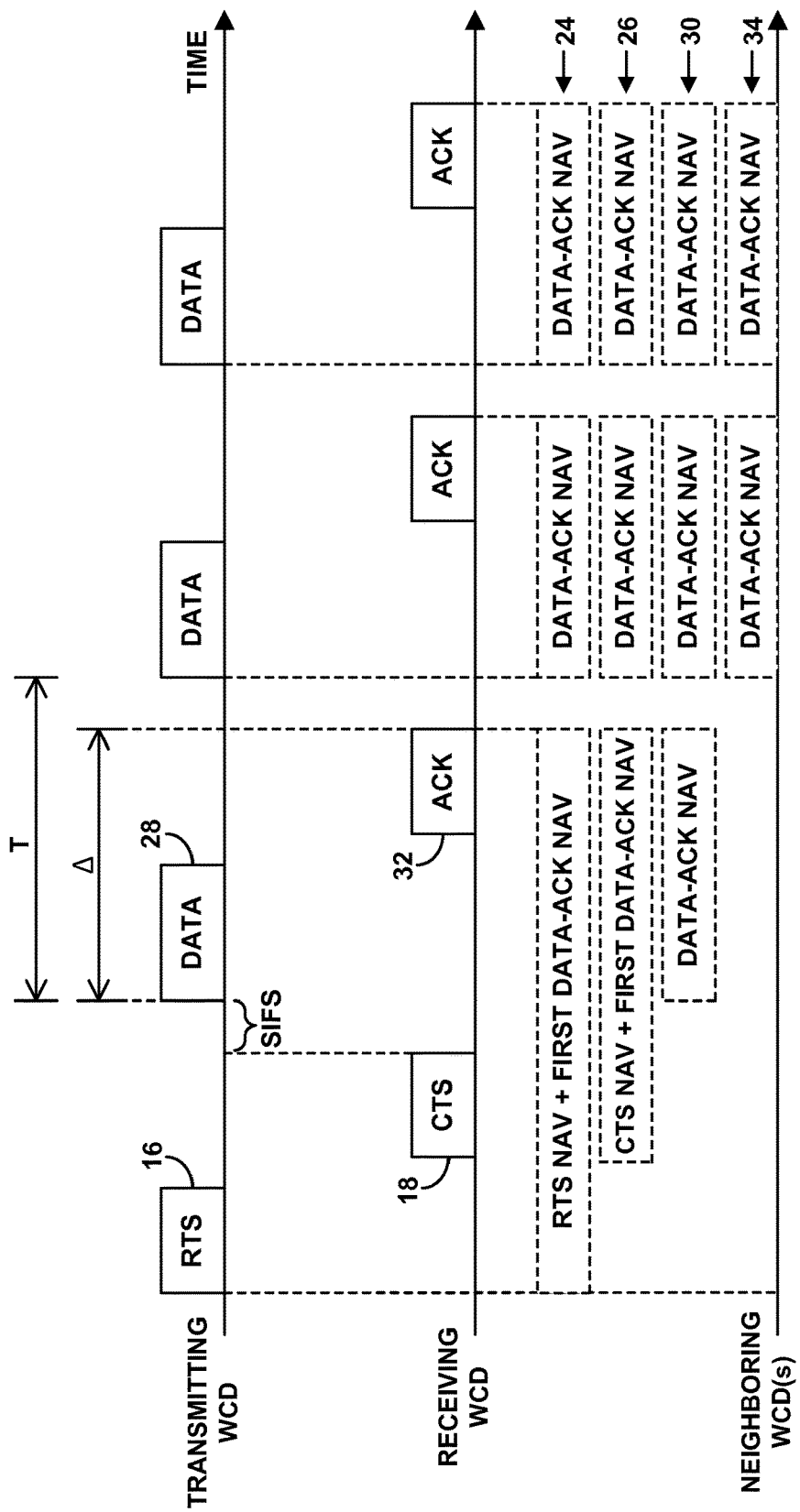
FIG. 3 is a depiction of an example process in accordance with the present disclosure.

FIG. 3 next depicts a simplified example of this process, where N=3 and where T is a defined duration (e.g., 20 milliseconds), as a variation from the arrangement shown in FIG. 2. FIG. 3 omits illustrations of some DIFS and SIFS periods for further simplicity.

As shown in FIG. 3, the transmitting WCD transmits an RTS message 16 to the receiving WCD and the receiving WCD transmits a CTS message 18 to the transmitting WCD, as in FIG. 2. Here, however, the transmitting WCD and receiving WCD then engage in a sequence of N data-ACK exchanges that are each of duration T (e.g., measured from data transmission to data transmission). The present process helps operate to efficiently manage use of the channel to accommodate such periodic data transmission.

In line with the discussion above, for instance, the RTS message and/or CTS message may include indicia of the number N of data-ACK exchanges in the planned sequence of data-ACK exchanges, the period T of the data-ACK exchanges, and the duration Δ of each data-ACK exchange. Thus, a neighboring WCD may accordingly determine, set, and apply appropriate NAVs to refrain from transmitting on the channel for the data-ACK exchanges of the sequence. For instance, neighboring WCD N1 (shown in FIG. 1) may read the indicia from the RTS message and determine, set, and apply an appropriate NAVs 24 as shown, including a first NAV extending through the first data-ACK exchange, a second NAV starting at time T after the first data-ACK exchange started and lasting duration Δ, and a third NAV starting at time T after the second data-ACK exchange started and lasting duration Δ. Likewise, neighboring WCD N2 (shown in FIG. 1) may read the indicia from the CTS message and determine, set, and apply appropriate NAVs 26 as shown, also including first, second, and third NAVs.

Further or alternatively, at least one data-ACK exchange in the sequence of data-ACK exchanges may include indicia of the number of remaining data-ACK exchanges in the sequence the period T of the data-ACK exchanges, and the duration Δ of each data-ACK exchange. FIG. 3 shows an example of this with respect to the first of the three example data-ACK exchanges. In this example, the transmitting WCD could include in its application data transmission 28 of the data-ACK exchange an indication that there are two remaining data-ACK exchanges after the current one or that there are three remaining data-ACK exchanges including the current one), an indication of the period T, and an indication of the duration Δ, and a neighboring WCD can thus read the data transmission in order to determine, set, and apply appropriate NAVs 30 to span the remaining duration of the first data-ACK exchange and each of the following two data-ACK exchanges. Similarly, the receiving WCD could include in its ACK message transmission 32 of the sequence an indication of the remaining data-ACK exchanges in the sequence, an indication of the period T, and an indication of the duration Δ, and a neighboring WCD can thus read the ACK message transmission in order to determine, set, and apply appropriate NAVs 34 to span the remaining two data-ACK exchanges of the sequence.

FIG. 4 is next a depiction of operations that can be carried out in accordance with an example implementation of this disclosure, to manage sequential communication on a wireless channel (such as on an individual 802.11 channel, and perhaps on each of multiple channels being used in an 802.11n/ac arrangement).

As shown in block 40 of FIG. 4, the operations include a first WCD and second WCD engaging in a sequence of N data-ACK exchanges with each other, where N>1, and where each data-ACK exchange consists of the first WCD transmitting application data to the second WCD (and the second WCD thus receiving such transmission) and the second WCD transmitting a corresponding acknowledgement (ACK) message to the first WCD (and the first WCD thus receiving such transmission). Further, as next shown in block 42, the operations include transmitting within at least one of the data-ACK exchanges an indication of how many data-ACK exchanges remain in the sequence. For instance, the first WCD may transmit in a header of the application data of the data-ACK exchange the indication of how many data-ACK exchanges remain in the sequence, and/or the second WCD may transmit in a header of the ACK message of the data-ACK exchange the indication of how many data-ACK exchanges remain in the sequence. As discussed above, the indication of how many data-ACK exchanges remain in the sequence may thus help a third WCD manage how many times to refrain from transmission on the channel.

In line with the discussion above, the data-ACK exchanges of the sequence may occur at a period T may each be of duration Δ, and the operations may further include transmitting in the at least one data-ACK exchange an indication of T and/or Δ, to help the third WCD manage how often to refrain from transmission on the channel and how long to refrain from transmission on the channel in each instance. For instance, the first WCD could transmit in the header of the application data of the data-ACK exchange indicia of how many data-ACK exchanges remain in the sequence and of T and Δ, and/or the second WCD could transmit in the header of the ACK message of the data-ACK exchange the indicia of how many data-ACK exchanges remain in the sequence and of T and/or Δ.

As noted above, for instance, the application data could be of a particular QoS class that corresponds with T and/or Δ, and the indication of T and/or Δ could be a specification of that QoS class. (In addition, as noted above, the operations may then further include, before finishing engaging in the sequence of data-ACK exchanges, detecting on the channel a communication having a QoS class higher than the application data's QoS class, and responsively aborting a remainder of the sequence of data-ACK exchanges.) Alternatively, given such a correlation between the QoS class and T and/or Δ, the first WCD and/or second WCD could determine the value T and/or the value Δ based on the QoS class of the application data at issue so as to then transmit in the data-ACK exchange the indicia of T and/or Δ.

Still further, as discussed above, the first and second WCDs may engage in an RTS/CTS handshake process for the sequence of data-ACK exchanges before engaging in the sequence of data-ACK exchanges. And the method of the present disclosure can avoid a need for the first and second WCDs to engage in a further RTS/CTS exchange with each other for any individual data-ACK exchanges of the sequence, so the first and second WCDs may not exchange such further RTS and CTS messages with each other for the sequence.

In practice, as discussed above, if the second WCD will include in a header of an ACK message the indication of how many data-ACK exchanges remain in the sequence, the second WCD may determine the number of remaining data-ACK exchanges based on information from the first WCD. For instance, the second WCD may receive in an RTS message from the first WCD an indication of N (e.g., a QoS class indication, which the second WCD could translate, based on lookup data or program logic, to a corresponding value of N). Alternatively or additionally, the second WCD could receive in the application data (e.g., in a header of the application data) of the data-ACK exchange an indication of N. And the second WCD may use that received indication of N as a basis to determine a quantity of data-ACK exchanges remaining in the sequence (by tracking how many data-ACK exchanges of the sequence have occurred so far), and may then indicate in the header of the ACK message the determined quantity.

Figure 5:
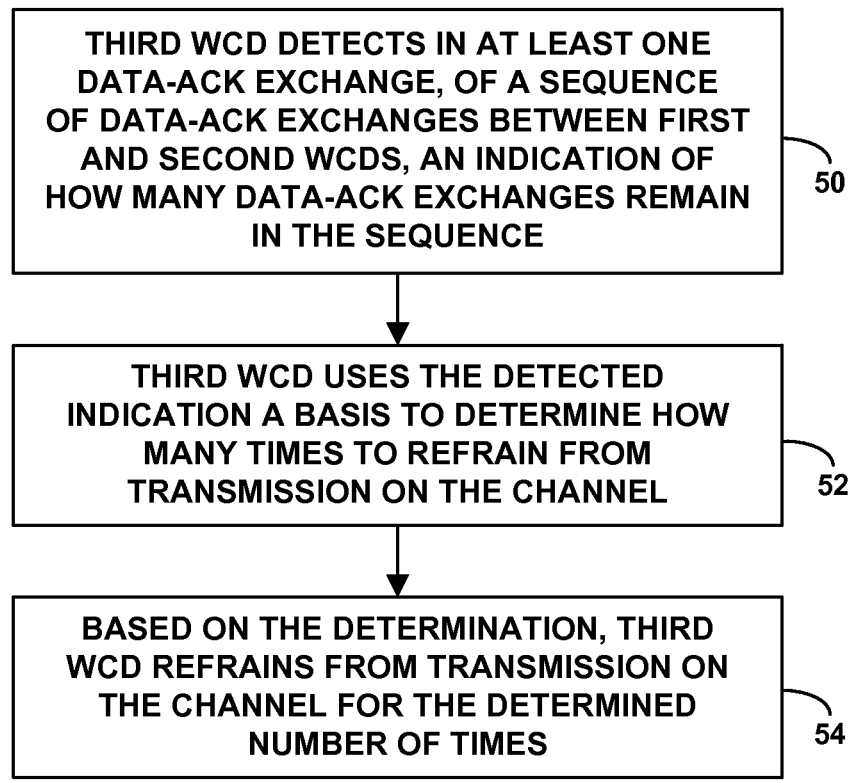
FIG. 5 is another depiction of operations in accordance with the disclosure.

FIG. 5 is next another depiction of operations that can be carried out in accordance with this disclosure to help manage such sequential communication on a wireless channel, from the perspective of a third WCD, when a first WCD and second WCD are the ones engaging the sequence of data-ACK exchanges with each other.

As shown in FIG. 5, at block 50, the operations include the third WCD detecting in at least one of the data-ACK exchanges an indication of how many data-ACK exchanges remain in the sequence. In turn, at block 52, the operations include the third WCD using the detected indication a basis to determine a number of times to refrain from transmission on the channel. And at block 54, the operations include, based on the determination, the third WCD refraining from transmission on the channel for the determined number of times.

As noted above, the operations in this process may further include the third WCD determining the period T of data- ACK exchanges of the sequence and the duration Δ of each data-ACK exchange of the sequence (e.g., by reading the period T and the period Δ, by reading a QoS class and mapping it to a period T and duration Δ, and/or by monitoring the duration of each data-ACK exchange and the timing between the start of each data-ACK exchange) and the third WCD using that determined information as a further basis to determine the period and duration, so as to refrain from transmission on the channel accordingly for the indicated number of times.

Finally, FIG. 6 is a simplified block diagram of an example WCD, showing some of the components that can be included in such a device to facilitate carrying out features such as those discussed above. This WCD could be configured to engage in 802.11 communications in line with the discussion above, and may thus at times function as a transmitting WCD, at other times function as a receiving WCD, and at other times function as a neighboring WCD.

As shown in FIG. 6, the example WCD includes a wireless communication interface 60 and a controller 62, which may be integrated together (e.g., on a common chipset) or otherwise communicatively linked together by a system bus or other connection mechanism. In practice, the wireless communication interface 60 may comprise an 802.11 (or other) radio and antenna structure, configured to transmit and receive on one or more designated channels, such as 20 MHz 802.11 wireless channels for instance, and thus to detect communications on such a channel, such as communications indicating by their MAC addresses that they are from one particular device to another and indicating by other contained information what type of communications they are. The controller 62 may take various forms (such as one or more processing units (e.g., microprocessors), non-transitory data storage, and program instructions executable by the processing unit(s), thus establishing a programmed processing unit), configured to carry out (e.g., to cause the WCD to carry out) various operations such as those discussed above.

For example, the operations may include engaging in a sequence of N data-ACK exchanges on the channel with a peer WCD, where N>1, and where each data-ACK exchange consists of transmission of application data between the WCDs followed by reply transmission of a corresponding acknowledgement (ACK) between the WCDs. Further, the operations may include transmitting in at least one of the data-ACK exchanges an indication of how many data-ACK exchanges remain in the sequence, where transmitting in the data-ACK exchange the indication of how many data-ACK exchanges remain in the sequence involves (i) transmitting in a header of the application data of the data-ACK exchange the indication of how many data-ACK exchanges remain in the sequence or (ii) transmitting in a header of the ACK message of the data-ACK exchange the indication of how many data-ACK exchanges remain in the sequence. (See FIG. 7.)

Still further, the data-ACK exchanges may occur at a period T and may each be of duration T, and the operations may include transmitting in the at least one data-ACK exchange an indication of T and/or Δ, where transmitting in the data-ACK exchange the indicia of how many data-ACK exchanges remain in the sequence and of T and/or Δ may involve (i) transmitting in the header of the application data of the data-ACK exchange the indicia of how many data-ACK exchanges remain in the sequence and of T and/or Δ or (ii) transmitting in the header of the ACK message of the data-ACK exchange the indicia of how many data-ACK exchanges remain in the sequence and of T and/or Δ. As noted above, for instance, the application data at issue could be of a particular QoS class that corresponds with T and/or Δ, and the indication of T and/or Δ could be a specification of the QoS class.

Yet further, the operations may include the WCD engaging in a handshake process with the peer WCD for the sequence of data-ACK exchanges, and the WCD may then not engage in a further RTS and CTS exchange with the peer WCD for any individual data-ACK exchanges of the sequence.

In addition, when functioning as a neighboring WCD, the operations may include the WCD detecting on the channel one or more indicia of how many data-ACK exchanges remain in a sequence of data-ACK exchanges between two communicating devices, how often each data-ACK exchange occurs, and how long each data-ACK exchange is, determining based on the detected one or more indicia how many times to refrain from transmitting on the channel, how often to so refrain, and how long to refrain in each instance, and refraining from transmitting on the channel accordingly. And the operations may further include detecting on the channel an indication of QoS class of a sequence of data-ACK exchange between two communicating devices, making a determination that the WCD seeks to communicate on the channel at a QoS level higher than the indicated QoS level, and, responsive to the determination, usurping use of the channel to engage in the communication at the higher QoS level.

Exemplary embodiments have been described above. Those skilled in the art will understand, however, that changes and modifications may be made to these embodiments without departing from the true scope and spirit of the invention.

We claim:

1. A method of managing communication on a wireless channel on which a first wireless communication device (WCD) and second WCD engage in a sequence of N data-ACK exchanges with each other, wherein N>1, wherein the sequence includes one or more non-final data-ACK exchanges and ends with a final data-ACK exchange, and wherein each data-ACK exchange consists of the first WCD transmitting application data to the second WCD and the second WCD transmitting a corresponding acknowledgement (ACK) message to the first WCD, the method comprising:

transmitting within at least one of the one or more non-final data-ACK exchanges an indication of how many data-ACK exchanges remain in the sequence, wherein the indication comprises a count of how many data-ACK exchanges remain in the sequence, whereby the indication of how many data-ACK exchanges remain in the sequence can help a third WCD manage how many times to refrain from transmission on the channel, wherein transmitting in the data-ACK exchange the indication of how many data-ACK exchanges remain in the sequence comprises at least one feature selected from the group consisting of (i) the first WCD transmitting in a header of the application data of the data-ACK exchange the indication of how many data-ACK exchanges remain in the sequence and (ii) the second WCD transmitting in a header of the ACK message of the data-ACK exchange the indication of how many data-ACK exchanges remain in the sequence.

2. The method of claim 1, wherein the data-ACK exchanges in the sequence occur periodically with a period T and each span a duration Δ, the method further comprising transmitting in the at least one data-ACK exchange indicia of T and Δ, whereby the indicia of T and Δ can help the third WCD manage how often and how long to refrain from transmission on the channel,
  wherein transmitting in the data-ACK exchange the indicia of how many data-ACK exchanges remain in the sequence and of T and Δ comprises at least one feature selected from the group consisting of (i) the first WCD transmitting in the header of the application data of the data-ACK exchange the indicia of how many data-ACK exchanges remain in the sequence and of T and Δ and (ii) the second WCD transmitting in the header of the ACK message of the data-ACK exchange the indicia of how many data-ACK exchanges remain in the sequence and of T and Δ.

3. The method of claim 2, wherein the application data is of a quality of service (QoS) class that corresponds with T and Δ, wherein the indicia of T and Δ is a specification of the QoS class.

4. The method of claim 3, further comprising:
  before finishing engaging in the sequence of data-ACK exchanges, detecting on the channel a communication having a QoS class higher than the application data's QoS class; and
  responsive to the detecting, aborting a remainder of the sequence of data-ACK exchanges.

5. The method of claim 2, wherein the application data is of a quality of service (QoS) class that corresponds with T and Δ, the method further comprising determining T and Δ based on the QoS class, so as to facilitate transmitting in the data-ACK exchange the indicia of T and Δ.

6. The method of claim 1, wherein, before engaging in the sequence of data-ACK exchanges with each other, the first WCD and second WCD engage in a handshake process for the sequence of data-ACK exchanges, wherein the handshake process consists of the first WCD transmitting to the second WCD a ready-to-send (RTS) message for the sequence and the second WCD transmitting to the first WCD, in response to the RTS message, a clear-to-send (CTS) message for the sequence.

7. The method of claim 6, wherein the first WCD and second WCD do not exchange further RTS and CTS messages with each other for any individual data-ACK exchanges of the sequence.

8. The method of claim 6, wherein transmitting in the data-ACK exchange the indication of how many data-ACK exchanges remain in the sequence comprises the second WCD transmitting in a header of the ACK message of the data-ACK exchange the indication of how many data-ACK exchanges remain in the sequence, and wherein the method further comprises:
  the second WCD receiving in the RTS message from the first WCD an indication of N; and
  the second WCD using the received indication of N as a basis to determine a quantity of data-ACK exchanges remaining in the sequence, wherein the second WCD transmits in the header of the ACK message of the data-ACK exchange, as the indication of how many data-ACK exchanges remain in the sequence, the determined quantity.

9. The method of claim 8, wherein the application data is of a quality of service (QoS) class that corresponds with N, wherein the indication of N is a specification of the QoS class, wherein the method further comprises:
  the second WCD determining N based on the specified QoS class,
  wherein using the received indication of N as the basis to determine the quantity of data-ACK exchanges remaining in the sequence comprises using the determined N as a basis to determine the quantity of data-ACK exchanges remaining in the sequence.

10. The method of claim 9, wherein the data-ACK exchanges in the sequence occur periodically with a period T and each span a duration Δ, wherein the QoS also corresponds with T and Δ, whereby the period T and duration Δ corresponding with the specified QoS class can further help a third WCD manage how long to refrain from transmission on the channel.

11. The method of claim 1, wherein transmitting in the data-ACK exchange the indication of how many data-ACK exchanges remain in the sequence comprises the second WCD transmitting in a header of the ACK message of the data-ACK exchange the indication of how many data-ACK exchanges remain in the sequence, and wherein the method further comprises:
  the second WCD receiving in the application data of the data-ACK exchange an indication of N; and
  the second WCD using the received indication of N as a basis to determine a quantity of data-ACK exchanges remaining in the sequence, wherein the second WCD transmits in the header of the ACK message of the data-ACK exchange, as the indication of how many data-ACK exchanges remain in the sequence, the determined quantity.

12. The method of claim 11, wherein the application data is of a quality of service (QoS) class that corresponds with N, wherein the indication of N is a specification of the QoS class, wherein the method further comprises:
  the second WCD determining N based on the specified QoS class,
  wherein using the received indication of N as the basis to determine the quantity of data-ACK exchanges remaining in the sequence comprises using the determined N as a basis to determine the quantity of data-ACK exchanges remaining in the sequence.

13. A wireless communication device (WCD) arranged to help manage communication on a wireless channel, wherein the WCD comprises:
  a wireless communication interface through which the WCD transmits and receives on the channel; and
  a processing unit programmed with instructions executable to cause the WCD to carry out operations comprising:
    (a) engaging in a sequence of N data-ACK exchanges on the channel with a peer WCD, wherein N>1, wherein the sequence includes one or more non-final data-ACK exchanges and ends with a final data-ACK exchange, and wherein each data-ACK exchange consists of transmission of application data between the WCDs, followed by reply transmission of a corresponding acknowledgement (ACK) between the WCDs, and
    (b) transmitting in at least one of the one or more non-final data-ACK exchanges an indication of how many data-ACK exchanges remain in the sequence, wherein the indication comprises a count of how many data-ACK exchanges remain in the sequence, wherein transmitting in the data-ACK exchange the indication of how many data-ACK exchanges remain in the sequence comprises a feature selected from the group consisting of (i) transmitting in a header of the application data of the data-ACK exchange the indication of how many data-ACK exchanges remain in the sequence and (ii) transmitting in a header of the ACK message of the data-ACK exchange the indication of how many data-ACK exchanges remain in the sequence.

14. The WCD of claim 13, wherein the data-ACK exchanges in the sequence occur periodically with a period T and each span a duration Δ, the operations further comprising transmitting in the at least one data-ACK exchange indicia of T and Δ, wherein transmitting in the data-ACK exchange the indicia of how many data-ACK exchanges remain in the sequence and of T and Δ comprises a feature selected from the group consisting of (i) transmitting in the header of the application data of the data-ACK exchange the indicia of how many data-ACK exchanges remain in the sequence and of T and Δ and (ii) transmitting in the header of the ACK message of the data-ACK exchange the indicia of how many data-ACK exchanges remain in the sequence and of T and Δ.

15. The WCD of claim 14, wherein the application data is of a quality of service (QoS) class that corresponds with T and Δ, wherein the indicia of T and Δ is a specification of the QoS class.

16. The WCD of claim 13, wherein the operations further comprise:

before engaging in the sequence of data-ACK exchanges with the peer WCD, the WCD engaging in a handshake process with the peer WCD for the sequence of data-ACK exchanges, wherein the handshake process consists of exchange of a ready-to-send (RTS) message for the sequence and exchange of a reply clear-to-send (CTS) message for the sequence, wherein the WCD does not engage in a further RTS and CTS exchange with the peer WCD for any individual data-ACK exchanges of the sequence.

17. The WCD of claim 13, wherein the operations further comprise:

detecting on the channel one or more indicia of how many data-ACK exchanges remaining in a sequence of data-ACK exchanges between two communicating devices, how often the data-ACK exchanges of the sequence occur, and how long each data-ACK exchange of the sequence is, making a determination, based on the detected one or more indicia, of how often to engage in an instance of refraining from transmitting on the channel and how long to refrain from transmitting on the channel in each instance, and refraining from transmitting on the channel in accordance with the determination.

18. The WCD of claim 13, wherein the operations further comprise:

detecting on the channel an indication of quality of service (QoS) class of a sequence of data-ACK exchange between two communicating devices, making a determination that the WCD seeks to communicate on the channel at a QoS level higher than the indicated QoS level, and, responsive to the determination, usurping use of the channel to engage in the communication at the higher QoS level.

19. A method of managing communication on a wireless channel, wherein a first wireless communication device (WCD) and second WCD engage in sequence of N data-ACK exchanges on the channel, wherein N>1, wherein the sequence includes one or more non-final data-ACK exchanges and ends with a final data-ACK exchange, and wherein each data-ACK exchange consists of the first WCD transmitting application data to the second WCD and the second WCD transmitting a corresponding acknowledgement (ACK) message to the first WCD, the method comprising:

detecting by a third WCD in at least one of the one or more non-final data-ACK exchanges an indication of how many data-ACK exchanges remain in the sequence, wherein the indication comprises a count of how many data-ACK exchanges remain in the sequence;

using by the third WCD the detected indication a basis to make a first determination of a number of times to refrain from transmission on the channel; and based on the first determination, refraining by the third WCD from transmission on the channel for the determined number of times.

20. The method of claim 19, wherein the data-ACK exchanges in the sequence occur periodically with a period T and each span a duration Δ, further comprising determining by the third WCD the period T and the duration Δ; and using by the third WCD the determined period T and duration Δ to make a second determination of how often to engage in an instance of refraining from transmitting on the channel and how long to refrain transmitting on the channel in each instance, wherein the refraining occurs in accordance with the second determination.

* * * * *